(12) United States Patent
Feng et al.

(10) Patent No.: US 11,854,718 B2
(45) Date of Patent: Dec. 26, 2023

(54) PREPARATION METHOD OF INSULATING DIELECTRIC FOR IMPROVING ENERGY DENSITY

(71) Applicant: Xi'an Jiaotong University, Shaanxi (CN)

(72) Inventors: Yang Feng, Shaanxi (CN); Anqi Yang, Shaanxi (CN); Shengtao Li, Shaanxi (CN); Liuqing Yang, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 650 days.

(21) Appl. No.: 17/037,618

(22) Filed: Sep. 29, 2020

(65) Prior Publication Data

US 2021/0166833 A1 Jun. 3, 2021

(30) Foreign Application Priority Data

Dec. 3, 2019 (CN) .......................... 201911221771.2

(51) Int. Cl.
| | | |
|---|---|---|
| B05D 5/00 | (2006.01) | |
| H01B 3/30 | (2006.01) | |
| C08G 18/08 | (2006.01) | |
| C08G 18/38 | (2006.01) | |
| C08G 18/76 | (2006.01) | |

(Continued)

(52) U.S. Cl.
CPC ......... H01B 3/302 (2013.01); C08G 18/0852 (2013.01); C08G 18/3234 (2013.01); C08G 18/3819 (2013.01); C08G 18/7614 (2013.01); C08G 73/1042 (2013.01);

(Continued)

(58) Field of Classification Search
CPC ........ H01B 3/302; H01B 3/306; H01B 19/02; C08G 18/0852; C08G 18/3234; C08G 18/3819; C08G 18/7614; C08G 73/1042; C08G 73/1071; C08G 73/1007;

(Continued)

(56) References Cited

U.S. PATENT DOCUMENTS

| 2012/0211258 A1* | 8/2012 | Nabeshima | .......... C09D 179/08 174/110 SR |
|---|---|---|---|
| 2019/0066868 A1* | 2/2019 | Hirayama | .............. H01B 3/307 |

FOREIGN PATENT DOCUMENTS

| CN | 103434236 A | * 12/2013 | |
|---|---|---|---|
| CN | 104530703 A | * 4/2015 | ......... C08G 73/1071 |
| JP | 2013155281 A | * 8/2013 | |

OTHER PUBLICATIONS

CN-103434236-A English translation (Year: 2023).*
CN-104530703-A English translation (Year: 2023).*
JP-2013155281-A English translation (Year: 2023).*

* cited by examiner

*Primary Examiner* — Hai Y Zhang
(74) *Attorney, Agent, or Firm* — Fredrikson & Byron, P.A.

(57) ABSTRACT

The present invention discloses a preparation method of an insulating dielectric for improving energy density, including dissolving 1,4-phenylene diisothiocyanate in a polar solvent, then adding an organic diamine, and reacting at room temperature for 3 h to 6 h under a nitrogen atmosphere; then adding 4,4'-oxydianiline and pyromellitic dianhydride, and reacting at room temperature for 12 h to 18 h under a nitrogen atmosphere to obtain a random copolymer solution of polythiourea and polyamic acid; and spreading the random copolymer solution of polythiourea and polyamic acid on a copper plate, and carrying out gradient temperature elevation to obtain a random copolymer of polythiourea and polyimide.

8 Claims, 3 Drawing Sheets

(51) Int. Cl.
*H01B 19/02* (2006.01)
*C08G 18/32* (2006.01)
*C08G 73/10* (2006.01)

(52) U.S. Cl.
CPC ......... *C08G 73/1071* (2013.01); *H01B 3/306* (2013.01); *H01B 19/02* (2013.01)

(58) Field of Classification Search
CPC ........... C08J 5/18; C08J 2379/08; B05D 5/00; B05D 2503/00; B05D 2505/00
See application file for complete search history.

PREPARATION METHOD OF INSULATING DIELECTRIC FOR IMPROVING ENERGY DENSITY

RELATED APPLICATIONS

This application claims priority to Chinese Patent Application No. 201911221771.2, filed Dec. 3, 2019, the entire contents of which are incorporated herein by reference.

TECHNICAL FIELD

The present invention belongs to the field of high voltage insulating materials, and particularly relates to a preparation method of an insulating dielectric for improving energy density.

BACKGROUND

With high power density and ultra-long cycle life, polymer thin-film energy storage capacitors can convert intermittent renewable energy sources with maximum efficiency, such as wind energy and tidal energy, and are irreplaceable core energy storage devices in high-power weapon systems, such as pulse power technology, electromagnetic gun and laser. Besides that, they are also widely applied in aerospace, hybrid vehicles and other fields. However, due to the low dielectric constant or breakdown strength of most polymers, the ability to store electrical energy is limited. For a long time, nano-doping has been mainly adopted by domestic and foreign scholars to improve the energy storage property of dielectrics, but the introduction of high volume fraction of nano fillers will inevitably increase the dielectric loss of the material. Therefore, it is of great significance for practical engineering applications to develop polymer energy storage capacitors with high energy density and excellent reliability, and to explore methods for increasing the energy density of polymer dielectric materials.

At present, researches on energy storage polymer materials mainly aim to improve the energy density by increasing the dielectric constant or the breakdown strength. In terms of dielectric constant, metal elements are introduced in the main chain of a molecule to increase the electronic polarization, or polar groups are introduced in the main chain and side chain of a molecule to increase the dipolar polarization, thereby improving the dielectric constant. In terms of breakdown strength, strong polar groups are introduced as high-energy electron scattering centers, or polymers with cross-linked structures are prepared, thereby improving the breakdown strength of the material. However, it is difficult to increase both the dielectric constant and the breakdown strength for a polymer with a single structure, because the improvement of one dielectric property will often lead to the deterioration of another dielectric property.

More and more attention has been paid by scholars to preparing a copolymer combining the advantages of two chain segments. Changing the components of a copolymer and their corresponding proportion are considered as effective methods to improve the dielectric constant and ensure the breakdown strength. Unfortunately, the improvement of energy density of a copolymer by these two modification methods is limited. Although the copolymer sequence also has an important impact on the macroscopic properties of a material, the role of the copolymer sequence played on the microphase structure, dielectric properties, energy density of a copolymer has seldom been studied.

SUMMARY

The present invention is intended to provide a preparation method of an insulating dielectric for improving energy density.

In order to achieve the above objective, the present invention adopts the following technical solutions.

The present invention provides a preparation method of an insulating dielectric for improving energy density, including the following steps:

1) completely dissolving 1,4-phenylene diisothiocyanate in a polar solvent, then adding an organic diamine, and reacting at room temperature for 3 h to 6 h under a nitrogen atmosphere to obtain an amine-terminated polythiourea precursor;

2) adding 4,4'-oxydianiline and pyromellitic dianhydride to the amine-terminated polythiourea precursor prepared in step 1), and reacting at room temperature for 12 h to 18 h under a nitrogen atmosphere to obtain a random copolymer solution of polythiourea and polyamic acid; and 3) with casting, spreading the random copolymer solution of polythiourea and polyamic acid on a copper plate, and conducting amidation by gradient temperature elevation to form a film, and finally to obtain a random copolymer of polythiourea and polyimide.

As a further improvement of the present invention, in step 1), the 1,4-phenylene diisothiocyanate and the polar solvent are used at a ratio of 0.96 mmol: (1-4) mL.

As a further improvement of the present invention, in step 1), the organic diamine is 1,3-diaminocyclohexane.

As a further improvement of the present invention, the total amount of the pyromellitic dianhydride and 1,4-phenylene diisothiocyanate is the same as the total amount of the 1,3-diaminocyclohexane and 4,4'-oxydianiline.

As a further improvement of the present invention, in step 1), the 1,4-phenylene diisothiocyanate and 1,3-diaminocyclohexane are used at an amount ratio of 0.96:1; and in step 2), the 4,4'-oxydianiline and pyromellitic dianhydride are used at an amount ratio of 0.96:1.

As a further improvement of the present invention, in step 1), the polar solvent is N,N-dimethylacetamide (DMAc) or N,N-dimethylformamide (DMF).

As a further improvement of the present invention, in step 3), the gradient temperature elevation is specifically as follows: 70° C. for 3 h; 100° C. for 1 h; 120° C. for 1 h; and finally 150° C. for 3 h. Compared with the prior art, the present invention has the following beneficial effects:

In the present invention, an amine-terminated polythiourea precursor is prepared first, and then 4,4'-oxydianiline and pyromellitic dianhydride are added to the amine-terminated polythiourea precursor. Different addition manners during the reaction procedure can lead to different copolymer sequence in the copolymer of polythiourea and polyimide, and thus the prepared PTU-b-PI block copolymer and PTU-r-PI random copolymer exhibit significantly different dielectric response characteristics and conductivity characteristics. The random sequence is more conducive to promoting the reorientation of polar groups under an applied electric field. Meanwhile, the formed single-phase microphase structure in the random copolymer enhances the carrier scattering strength of dipoles, thus reducing the conductivity of the copolymer. These changes help to increase the dielectric constant, breakdown strength and energy density of the material. Compared with the PTU-b-PI block copolymer, the PTU-r-PI random copolymer has a dielectric constant (20° C., 0.1 Hz) increasing from 4.55 to 6.85, a DC breakdown strength at room temperature improving from 472 MV/m to 732 MV/m, and an energy density increasing from 4.49 J/cm$^3$ to 16.2 J/cm$^3$. The method provided in the present invention can significantly improve the energy density of an insulating dielectric material, and with advantages such as good processability, strong operability and high reliability, can be widely used in the field of high voltage insulating materials.

Further, compared with 1,3-phenylenediamine, the alicyclic structure of 1,3-diaminocyclohexane has a stronger steric hindrance effect, which increases the distance among molecular chains, facilitates the reorientation of polar thiourea groups under an applied electric field, and benefits the improvement of dipolar polarization and dielectric constant. Compared with an aliphatic diamine, the structure of 1,3-diaminocyclohexane is more rigid, which can hinder the motion of large-scale molecular chains, thereby maintaining low dielectric loss. Therefore, in the present invention, 1,3-diaminocyclohexane is adopted as a reactive monomer.

DETAILED DESCRIPTION

The present invention will be further described in detail below with reference to specific examples.

The present invention provides a preparation method of an insulating dielectric for improving energy density, and the method includes the following steps:
1) 1,4-phenylene diisothiocyanate is completely dissolved in a polar solvent, then 1,3-diaminocyclohexane is added, and the mixture reacts at room temperature for 3 h to 6 h under a nitrogen atmosphere to obtain an amine-terminated polythiourea precursor, where,
   the 1,4-phenylene diisothiocyanate and the polar solvent are used at a ratio of 0.96 mmol: (1-4) mL,
   the total amount of the pyromellitic dianhydride and 1,4-phenylene diisothiocyanate is the same as the total amount of the 1,3-diaminocyclohexane and 4,4'-oxydianiline,
   the 1,4-phenylene diisothiocyanate and 1,3-diaminocyclohexane are used at an amount ratio of 0.96:1,
   the 4,4'-oxydianiline and pyromellitic dianhydride are used at an amount ratio of 0.96:1, and
   the polar solvent is DMAc or DMF;
2) 0.96 mmol of 4,4'-oxydianiline and 1 mmol of pyromellitic dianhydride are added to the amine-terminated polythiourea precursor prepared in step 1), and the mixture reacts at room temperature for 12 h to 18 h under a nitrogen atmosphere to obtain a random copolymer solution of polythiourea and polyamic acid (PTU-r-PAA); and
3) with casting, the random copolymer PTU-r-PAA solution is spread on a cleaned copper plate, amidation is conducted by gradient temperature elevation (70° C. for 3 h; 100° C. for 1 h; 120° C. for 1 h; and 150° C. for 3 h) to form a film, and finally vacuumization and drying are conducted at 100° C. for 24 h to obtain a random copolymer of polythiourea and polyimide (PTU-r-PI).

SPECIFIC EXAMPLES

Example 1

Figure 2:
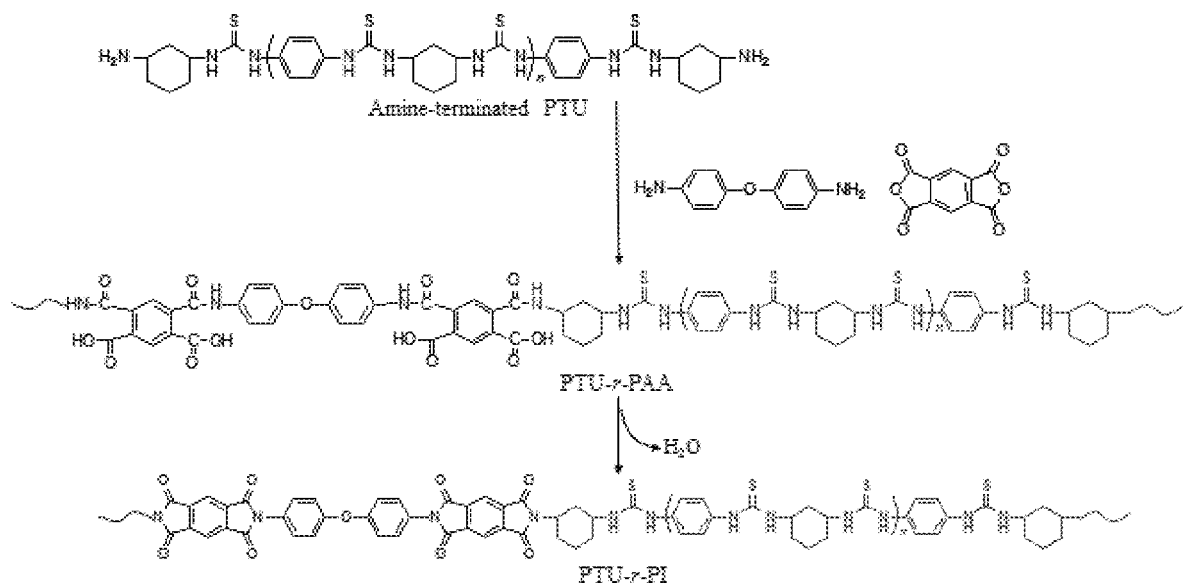
FIG. 2 shows the synthetic route of PTU-r-PI.

As shown in FIG. 2, a preparation method of an insulating dielectric for improving energy density is provided, and the method includes the following steps:
1) 0.96 mmol of 1,4-phenylene diisothiocyanate was completely dissolved in 2 mL of DMAc, then 1 mmol of 1,3-diaminocyclohexane was added, and the mixture reacted at room temperature for 6 h under a nitrogen atmosphere to obtain an amine-terminated polythiourea precursor;
2) 0.96 mmol of 4,4'-oxydianiline and 1 mmol of pyromellitic dianhydride were successively added to the amine-terminated polythiourea precursor prepared in step 1), and the mixture reacted at room temperature for 18 h under a nitrogen atmosphere to obtain a random copolymer solution of polythiourea and polyamic acid (PTU-r-PAA); and
3) with casting, the random copolymer PTU-r-PAA solution was spread on a cleaned copper plate, amidation was conducted by gradient temperature elevation (70° C. for 3 h; 100° C. for 1 h; 120° C. for 1 h; and 150° C. for 3 h) to form a film, and finally vacuumization and drying were conducted at 100° C. for 24 h to obtain a random copolymer of polythiourea and polyimide (PTU-r-PI).

Comparative Example

Figure 1:
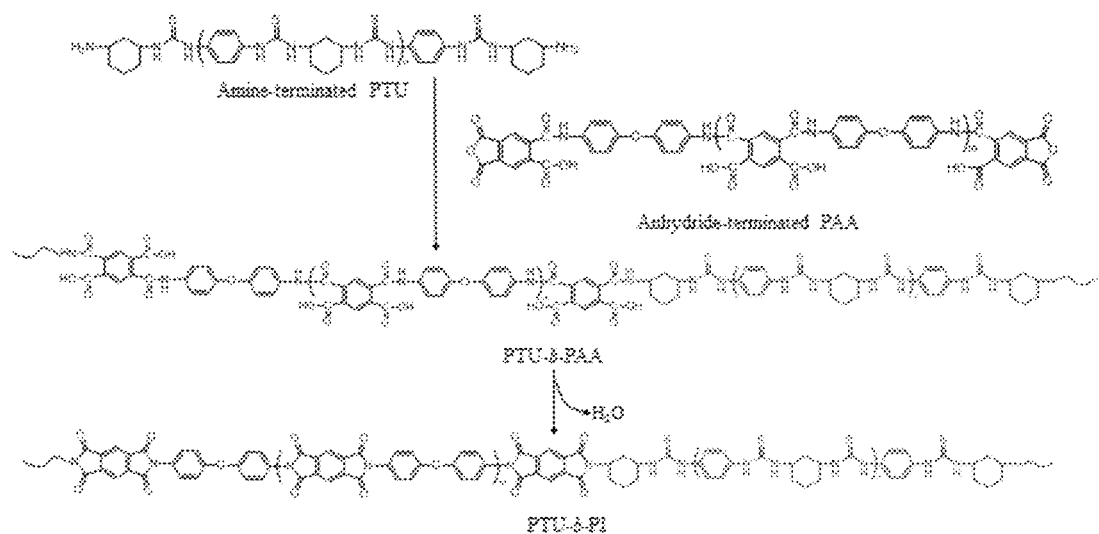
FIG. 1 shows the synthetic route of PTU-b-PI.

As shown in FIG. 1, a preparation method for a block copolymer of polythiourea and polyimide (PTU-b-PI) includes the following steps:
1) 0.96 mmol of 1,4-phenylene diisothiocyanate was completely dissolved in 2 mL of DMAc, then 1,3-diaminocyclohexane was added, and the mixture reacted at room temperature for 6 h under a nitrogen atmosphere to obtain an amine-terminated polythiourea precursor;
2) 0.96 mmol of 4,4'-oxydianiline was completely dissolved in 4 mL of DMAc, then 1 mmol of pyromellitic dianhydride was added, and the mixture reacted at room temperature for 6 h under a nitrogen atmosphere to obtain an anhydride-terminated polyamic acid precursor;
3) the amine-terminated polythiourea precursor and the anhydride-terminated polyamic acid precursor were mixed, and the mixture reacted at room temperature for 18 h under a nitrogen atmosphere to obtain a block copolymer solution of polythiourea and polyamic acid (PTU-b-PAA); and
4) with casting, the block copolymer PTU-b-PAA solution was spread on a cleaned copper plate, amidation was conducted by gradient temperature elevation (70° C. for 3 h; 100° C. for 1 h; 120° C. for 1 h; and 150° C. for 3 h) to form a film, and finally vacuumization and drying were conducted at 100° C. for 24 h to obtain a block copolymer of polythiourea and polyimide (PTU-b-PI).

Figure 3:
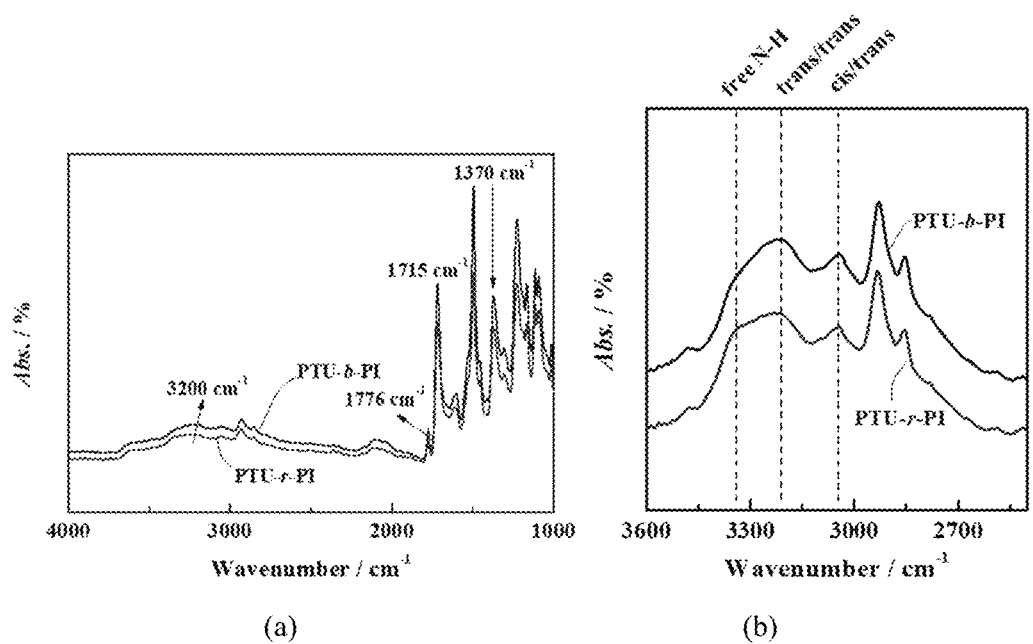
FIG. 3 shows the infrared spectra of PTU-r-PI and PTU-b-PI, where (a) is an overall view, and (b) is an enlarged partial view for (a).

It can be seen from (a) and (b) in FIG. 3 that there are many free polar thiourea bonds in PTU-r-PI, so it is easier to reorient under an external electric field. The dielectric strength can increase to 0.96 due to the polar thiourea groups in PTU-r-PI, as shown in Table 1.

Table 1 shows the dielectric response characteristic parameters of PTU-b-PI and PTU-r-PI, where α', β and γ are relaxation processes caused by the localized motion of segmental PTU chains, the reorientation of polar amide groups and the reorientation of polar thiourea groups, respectively. Table 2 shows the high field conductivities of PTU-b-PI and PTU-r-PI samples.

TABLE 1

Dielectric strength of each relaxation process in PTU-b-PI and PTU-r-PI samples

| Sample | Peak | Dielectric strength ΔЄ |
|---|---|---|
| PTU-b-PI | α' | 1.09 |
|  | β | 0.029 |
|  | γ | 0.56 |
| PTU-r-PI | α' | 0.96 |
|  | β | 0.39 |
|  | γ | 0.94 |

TABLE 2

High field conductivities of PTU-b-PTU and PI-r-PTU samples

| Sample | Conductivity/(S/m) |
|---|---|
| PTU-b-PI | $2.04 \times 10^{-15}$ |
| PTU-r-PI | $2.88 \times 10^{-16}$ |

The dielectric response characteristics of PI-b-PTU and PI-r-PTU samples were tested using Novocontrol broadband dielectric spectroscopy system. Before the test, gold electrodes were sputtered on both sides of the sample, and had a diameter of 12.8 mm. The test conditions were as follows: frequency range: 0.1 Hz to $10^6$ Hz; temperature range: $-150°$ C. to $120°$ C.; and temperature interval during the measurement of a dielectric temperature spectrum: $10°$ C. During the test, AC voltage was applied to the two ends of the sample, with a voltage amplitude of 1V.

In the DC breakdown test, the samples had a thickness of 15 and the thickness of samples was maintained consistent during the test. The electrodes were stainless steel ball electrodes with a diameter of 25 mm. The sample and electrodes were placed in transformer oil for test to avoid the effect of surface flashover along the edge of the sample. The HJC-100 kV breakdown instrument was adopted for the DC test, and the continuous voltage rise method was adopted to measure the breakdown voltage for the sample, with a voltage rise rate of 0.5 kV/s. Then the breakdown strength of the sample was calculated by dividing the breakdown voltage by the thickness of the sample. At least 10 breakdown points were tested for each sample in a breakdown test, and the breakdown strength was calculated for the breakdown points. The breakdown strength of the sample was analyzed by two-parameter Weibull function.

For the copolymer of polythiourea and polyimide, a linear polymer, the energy density could be calculated by the following formula:

$$U_e = \tfrac{1}{2}\varepsilon_0\varepsilon_r E_b^2,$$

and in the formula, $\varepsilon_0$ is the vacuum dielectric constant, $\varepsilon_r$ is the relative dielectric constant for a sample, and $E_b$ is the DC breakdown strength for a sample.

Figure 4:
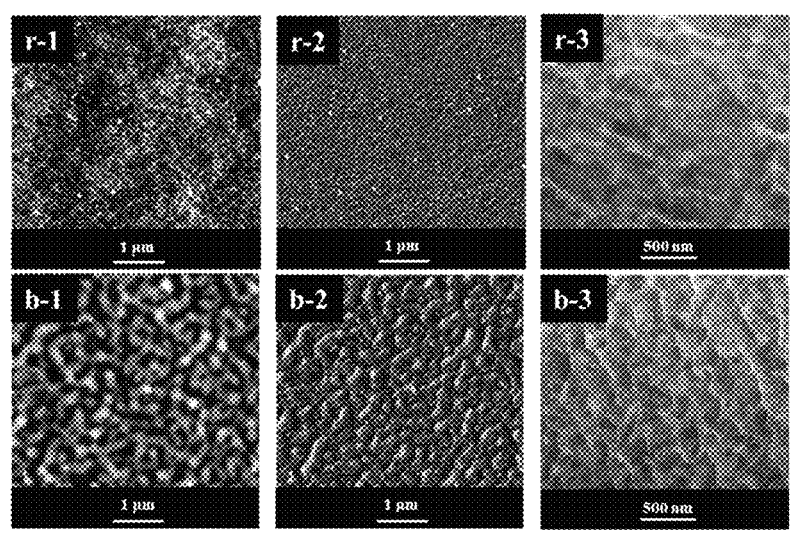
FIG. 4 shows morphologies of PTU-r-PI and PTU-b-PI, (1) height, (2) phase AFM images and (3) cross-sectional TEM image, where b and r represent PTU-b-PI and PTU-r-PI, respectively. Especially, the sharp interface in phase-separated PTU-b-PI is marked by a line.
Figure 5:
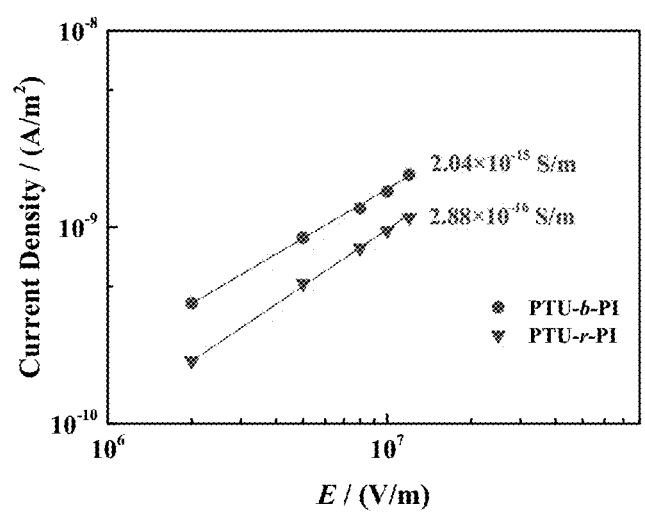
FIG. 5 shows the current density of PTU-b-PI and PTU-r-PI versus the external electric field.

It can be seen from FIG. 4 that the morphology difference indicates that there is a clear phase separation in PTU-b-PI, while the structure in PTU-r-PI is uniform. Therefore, the resistivity of PTU-b-PI conforms to the general mixing rule, while the resistivity of PTU-r-PI conforms to Nordheim's rule, making PTU-r-PI have a conductivity much lower than that of PTU-b-PI, as shown in FIG. 5. It seems that the electrons can continuously transfer through microphase regions in PTU-b-PI, without much frequent scattering. Hence, the two-phase PTU-b-PI can't suppress the electron multiplication process, leading to a decrease in the breakdown strength. However, the electrons in the single-phase PTU-r-PI are easily scattered by randomly distributed dipoles, thus leading to a reduced electron mobility. This process will slow down the electron multiplication process and ultimately bring about an increase in the breakdown strength of PTU-r-PI. Consequently, PTU-r-PI has a breakdown strength significantly higher than that of PTU-b-PI, as shown in Table 3.

Table 3 shows the dielectric constant, breakdown strength and energy density of the two copolymers.

TABLE 3

Dielectric properties and energy density of PTU-b-PI and PTU-r-PI samples

| Sample | Dielectric constant (0.1 Hz) | Breakdown field strength/(MV/m) | Energy density/(J/cm³) |
|---|---|---|---|
| PTU-b-PI | 4.55 | 472 | 4.49 |
| PTU-r-PI | 6.85 | 732 | 16.2 |

It can be seen from Table 3 that the random copolymer of polythiourea and polyimide is conducive to increasing both the dielectric constant and the breakdown strength, thereby improving the energy density. Compared with the block copolymer of polythiourea and polyimide, the random copolymer has a dielectric constant, a breakdown field strength and an energy density that are increased by 50.5%, 55.1%, and 261%, respectively.

Example 2

A preparation method of an insulating dielectric for improving energy density includes the following steps:
1) 0.96 mmol of 1,4-phenylene diisothiocyanate was completely dissolved in 1 mL of DMAc, then 1 mmol of 1,3-diaminocyclohexane was added, and the mixture reacted at room temperature for 3 h under a nitrogen atmosphere to obtain an amine-terminated polythiourea precursor;
2) 0.96 mmol of 4,4'-oxydianiline and 1 mmol of pyromellitic dianhydride were successively added to the amine-terminated polythiourea precursor prepared in step 1), and the mixture reacted at room temperature for 18 h under a nitrogen atmosphere to obtain a random copolymer solution of polythiourea and polyamic acid (PTU-r-PAA); and
3) with casting, the random copolymer PTU-r-PAA solution was spread on a cleaned copper plate, amidation was conducted by gradient temperature elevation ($70°$ C. for 3 h; $100°$ C. for 1 h; $120°$ C. for 1 h; and $150°$ C. for 3 h) to form a film, and finally vacuumization and drying were conducted at 100° C. for 24 h to obtain a random copolymer of polythiourea and polyimide (PTU-r-PI).

Example 3

A preparation method of an insulating dielectric for improving energy density includes the following steps:
1) 0.96 mmol of 1,4-phenylene diisothiocyanate was completely dissolved in 4 mL of DMAc, then 1 mmol of 1,3-diaminocyclohexane was added, and the mixture reacted at room temperature for 4 h under a nitrogen atmosphere to obtain an amine-terminated polythiourea precursor;
2) 0.96 mmol of 4,4'-oxydianiline and 1 mmol of pyromellitic dianhydride were successively added to the amine-terminated polythiourea precursor prepared in step 1), and the mixture reacted at room temperature for 12 h under a nitrogen atmosphere to obtain a random copolymer solution of polythiourea and polyamic acid (PTU-r-PAA); and
3) with casting, the random copolymer PTU-r-PAA solution was spread on a cleaned copper plate, amidation was conducted by gradient temperature elevation (70° C. for 3 h; 100° C. for 1 h; 120° C. for 1 h; and 150° C. for 3 h) to form a film, and finally vacuumization and drying were conducted at 100° C. for 24 h to obtain a random copolymer of polythiourea and polyimide (PTU-r-PI).

Example 4

A preparation method of an insulating dielectric for improving energy density includes the following steps:
1) 0.96 mmol of 1,4-phenylene diisothiocyanate was completely dissolved in 3 mL of DMAc, then 1 mmol of 1,3-diaminocyclohexane was added, and the mixture reacted at room temperature for 6 h under a nitrogen atmosphere to obtain an amine-terminated polythiourea precursor;
2) 0.96 mmol of 4,4'-oxydianiline and 1 mmol of pyromellitic dianhydride were successively added to the amine-terminated polythiourea precursor prepared in step 1), and the mixture reacted at room temperature for 15 h under a nitrogen atmosphere to obtain a random copolymer solution of polythiourea and polyamic acid (PTU-r-PAA); and
3) with casting, the random copolymer PTU-r-PAA solution was spread on a cleaned copper plate, amidation was conducted by gradient temperature elevation (70° C. for 3 h; 100° C. for 1 h; 120° C. for 1 h; and 150° C. for 3 h) to form a film, and finally vacuumization and drying were conducted at 100° C. for 24 h to obtain a random copolymer of polythiourea and polyimide (PTU-r-PI).

The preparation method provided in the present invention can significantly increase the energy density of an insulating dielectric material. The present invention changes dielectric response characteristics and conductivity of a material by adjusting the copolymer sequence in the copolymer, so as to control the dielectric constant and breakdown strength of the material, and finally to control or improve the energy density of the material. The method can be widely applied in many fields, such as high-voltage energy storage equipment, pulse power sources, aerospace and hybrid vehicles.

What is claimed is:
1. A preparation method of an insulating dielectric for improving energy density, comprising the following steps:
1) Completely dissolving 1,4-phenylene diisothiocyanate in a polar solvent, then adding an organic diamine, and reacting at room temperature for 3 h to 6 h under a nitrogen atmosphere to obtain an amine-terminated polythiourea precursor;
2) Adding 4,4'-oxydianiline and pyromellitic dianhydride to the amine-terminated polythiourea precursor prepared in step 1), and reacting at room temperature for 12 h to 18 h under a nitrogen atmosphere to obtain a random copolymer solution of polythiourea and polyamic acid; and
3) with casting, spreading the random copolymer solution of polythiourea and polyamic acid on a copper plate, and conducting amidation by gradient temperature elevation to form a film, and finally to obtain a random copolymer of polythiourea and polyimide.

2. The preparation method of an insulating dielectric for improving energy density according to claim 1, wherein, in step 1), the 1,4-phenylene diisothiocyanate and the polar solvent are used at a ratio of 0.96 mmol: (1-4) mL.

3. The preparation method of an insulating dielectric for improving energy density according to claim 1, wherein, in step 1), the organic diamine is 1,3-diaminocyclohexane.

4. The preparation method of an insulating dielectric for improving energy density according to claim 1, wherein, the total amount of the pyromellitic dianhydride and 1,4-phenylene diisothiocyanate is the same as the total amount of 1,3-diaminocyclohexane and 4,4'-oxydianiline.

5. The preparation method of an insulating dielectric for improving energy density according to claim 4, wherein, in step 1), the 1,4-phenylene diisothiocyanate and 1,3-diaminocyclohexane are used at an amount ratio of 0.96:1; and
in step 2), the 4,4'-oxydianiline and pyromellitic dianhydride are used at an amount ratio of 0.96:1.

6. The preparation method of an insulating dielectric for improving energy density according to claim 1, wherein, in step 1), the polar solvent is N,N-dimethylacetamide (DMAc) or N,N-dimethylformamide (DMF).

7. The preparation method of an insulating dielectric for improving energy density according to claim 1, wherein, in step 3), the gradient temperature elevation is specifically as follows:
70° C. for 3 h;
100° C. for 1 h;
120° C. for 1 h; and
finally 150° C. for 3 h.

8. The preparation method of an insulating dielectric for improving energy density according to claim 1, wherein, in step 1), the 1,4-phenylene diisothiocyanate and 1,3-diaminocyclohexane are used at an amount ratio of 0.96:1; and
in step 2), the 4,4'-oxydianiline and pyromellitic dianhydride are used at an amount ratio of 0.96:1.

* * * * *